United States Patent [19]

Cromer

[11] Patent Number: 4,681,088
[45] Date of Patent: Jul. 21, 1987

[54] FREEZE PROTECTION VALVE FOR SOLAR HEATERS

[76] Inventor: Charles J. Cromer, 460 Indian Creek Dr., Cocoa Beach, Fla. 32931

[21] Appl. No.: 843,206

[22] Filed: Mar. 24, 1986

[51] Int. Cl.$^4$ .......................... F24J 2/40; F16K 31/44
[52] U.S. Cl. .................. 126/420; 236/99 R; 251/75; 137/62; 137/468
[58] Field of Search ............... 126/420, 422; 236/99 J, 236/99 R; 251/75; 137/468, 62

[56] References Cited

U.S. PATENT DOCUMENTS

| | | | |
|---|---|---|---|
| 1,681,911 | 8/1928 | Spencer | 251/75 X |
| 1,699,468 | 1/1929 | Grayson | 251/75 X |
| 1,897,155 | 2/1933 | Vaughn | 251/75 X |
| 1,990,747 | 2/1935 | Netschert | 251/75 X |
| 2,394,321 | 12/1966 | Couffer | 236/99 R |
| 2,608,352 | 8/1952 | Schuster et al. | 251/75 X |
| 2,767,733 | 10/1956 | Anderson | 251/75 X |
| 3,108,747 | 10/1963 | Nielsen | 236/99 R |
| 4,344,450 | 8/1982 | Walters | 137/62 |
| 4,557,252 | 12/1985 | Dinh | 236/99 R X |

Primary Examiner—Randall L. Green
Attorney, Agent, or Firm—William M. Hobby, III

[57] ABSTRACT

An automatic freeze protection valve apparatus for solar heaters is provided with a remote sensing element, remote from the valve itself and which operates in a non-modulating fashion. The valve includes a valve housing with a remote sensor operatively connected thereto from a remote position. The remote sensor includes a bulb containing a liquid adapted to compress and expand with the temperature adjacent the bulb. A piston located in the valve body is slidable therein responsive to the expansion and contraction of the liquid in the remote sensor. A valve element located in the valve housing and attached to the piston allows movement therewith. A valve seat positioned in a water passageway allows the flow of fluid therethrough when the valve is in an open position and to cut off the flow when the valve is in a closed position. The valve prevents modulation by biasing the valve to a closed position until a predetermined temperature is reached, and thereafter biases the valve in an open position so that a freeze protection valve for solar heaters is remotely located from the sensor and is non-modulating and is not affected by valve temperature.

3 Claims, 2 Drawing Figures

FREEZE PROTECTION VALVE FOR SOLAR HEATERS

BACKGROUND OF THE INVENTION

The present invention relates to an automatic freeze protection valve for fluids under pressure and especially to a freeze protection valve for solar heaters to prevent the freezing of liquids in solar panels and the like.

In the past, solar water heating systems have a roof mounted collector panel which includes headers or manifolds and a plurality of tubes extending between the headers or a single tube applied in a coiled or serpentine fashion. This collector panel is connected by piping to a storage tank and includes means to move the solar heated water from the panel to the tank.

The prior art freeze protection valves include those that isolate the solar panel and then drain the water within it upon the valve reaching a predetermined temperature. Other freeze protection valves isolate the collector panel and then drain the water back into a container or tank section designed for capturing the water. This type of valve is commonly electrically actuated.

Another type of valve is one that utilizes a wax plug or freon under pressure from within the valve to activate the valve opening to flush water through the panel and piping and then to dispell it outside of the solar water heating system. The flushing water from the residential or commercial plumbing system typically has a temperature of 50 to 65 degrees fahrenheit and thus warms the panel and plumbing above freezing. Such valves commonly open when their temperature falls to 42 to 43 degrees fahrenheit and close when their temperature rises to 43 and 45 degrees fahrenheit. The prior art freeze protection valves sense the temperature of their activating fluid from within the valve itself, either at the inlet or at the lower portion of the valve. These valves, by design, either measure collector inlet or outlet fluid temperature or ambient temperature. Under freeze conditions, however, the coldest portion of the absorber panel experiences temperatures typically 10 to 15 degrees fahrenheit colder than ambient, and 8 to 10 degrees colder than inlet or outlet connections due to the evening sky radiation heat loss. Under some conditions these temperature differences can be much greater. Because this temperature difference is not sensed, conventional valves may allow portions of the absorber panel to freeze before they begin to purge fluid. This freezing thus defeats the freeze protection purpose of the valve. At other times, conditions such as cloudy skies and windy, will cause the ambient temperature to drop to approximately 40 degrees fahrenheit and the panel absorber will also be at 40 degrees fahrenheit and not in jeopardy of freezing. Prior art freeze protection valves sensing temperatures below their set points will purge the panel dumping water unnecessarily under these conditions.

Typical prior art purge valves provide a modulating flow of purging fluid dependent upon temperature. As the temperature drops to their point of actuation the valves allow a small trickle of flow to begin. The temperature continues to decrease, they increase the purging flow. Such a modulated flow would appear beneficial as it would minimize the amount of water purged and in fact does minimize this flow of water and works well for serpentine or coil type collectors. However, the majority of collectors installed presently are of the header type. Such a modulated flow and the low flow first introduced allow flow patterns to develop within the panel absorber itself such that some riser tubes receive a greater flow of liquid than others. It is a common occurrence that even with prior art freeze protection valves actuated to purge, some panel risers which are starved for purge flow, do freeze, defeating the purpose of the valve.

Freeze protection valves have also used wax or freon to activate the valve. These valves may reach temperatures from 300 to 400 degrees fahrenheit under panel stagnation. Such high temperature cycling tends to cause a change in the activation temperature of the wax valves and a leakage of the freon in the freon valves which leads to valves that will activate more often than necessary.

| INVENTOR | U.S. PAT. NO. |
| --- | --- |
| B. OQUIDAM | 4,309,982 |
| E. F. DUVAL | 4,280,478 |
| D. J. KAZIMIR | 4,453,534 |
| M. F. SCHOENHEIMER | 4,454,890 |
| ANDRE BONNET | 4,368,724 |
| L. A. KOLZE | 4,460,006 |
| W. B. NOLAND | 3,480,027 |
| F. DONNELLY | 4,457,326 |
| W. R. WALTERS | 3,642,015 |

The present invention contemplates a new and improved freeze protection valve which activates based on absorber panel temperature and is unaffected by the ambient or fluid temperature flowing through it, thus allowing for a lower set point and less unnecessary cycling. The present valve utilizes an activating material, such as mercury, which provides better resistance and longevity to affect the temperature cycles, and a valve which is designated to open fully upon activation temperature, providing maximum purge flow rather than modulating the flow.

BRIEF DESCRIPTION OF THE DRAWINGS

Other objects, features and advantages of the present invention will be apparent from the written description and the drawings in which.

DESCRIPTION OF THE PREFERRED EMBODIMENTS

Figure 1:
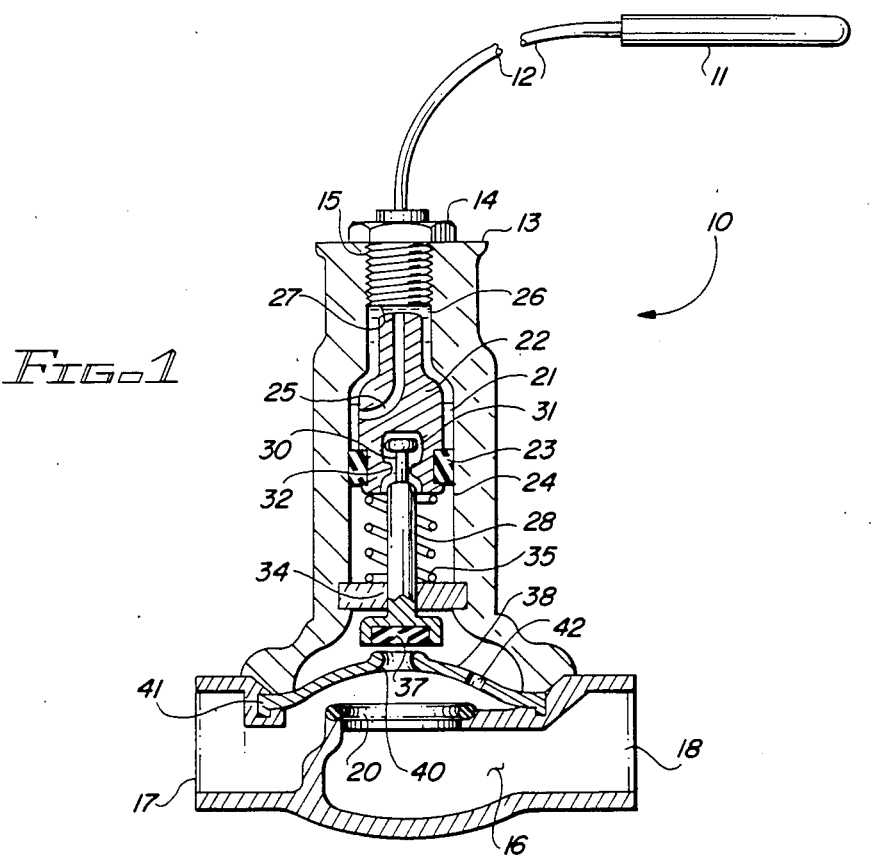
FIG. 1 is a sectional view of a freeze protection valve in accordance with the present invention in an open position.
Figure 2:
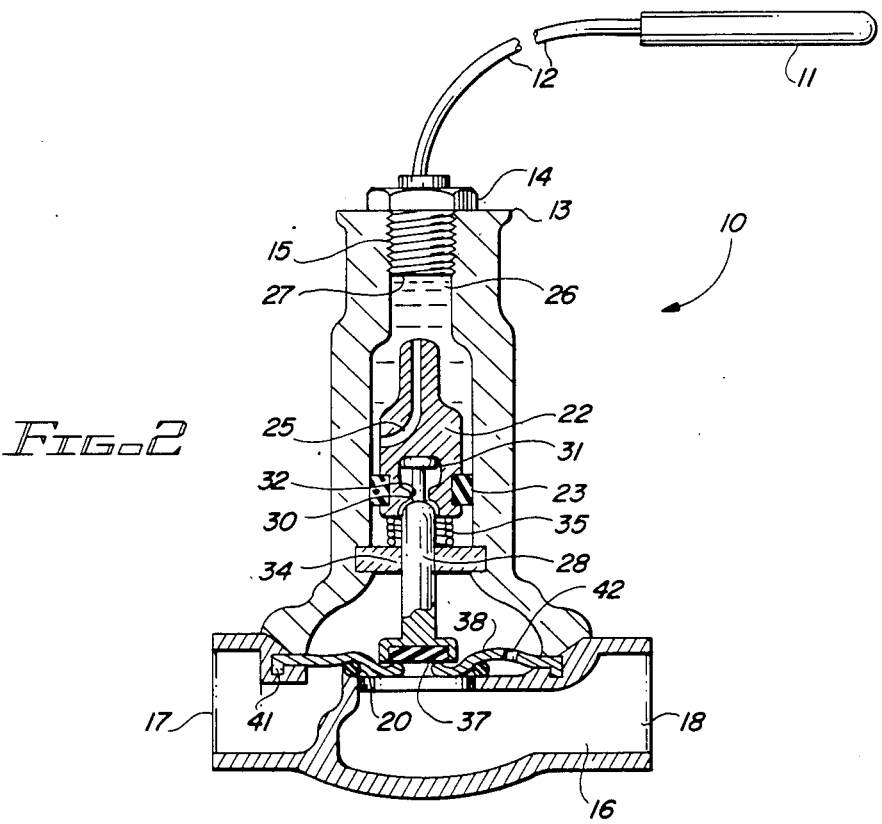
FIG. 2 is a sectional view of a freeze protection valve in accordance with FIG. 1 in a closed position.

Referring to drawings, a freeze protection valve 10 is shown in an open position in FIG. 1 and in a closed position in FIG. 2, and having a remote sensor bulb 11 connected to a sensor tube 12 to the freeze protection valve body 13 through a threaded plug 14. Threaded plug 14 is on the end of the tube 12 and is threaded into internal threads 15 in the valve body 13. The valve body has a passageway 16 passing therethrough from the normal pressure side 17 to the dump side 18 and through a valve seat 20. The valve body 13 forms a chamber 21 thereinside for a piston 22 to slide therein. The piston 22 has an annular hydraulic seal 23 mounted therearound for sliding on the internal walls 24 while being supported on the piston 22 for sliding therewith. The chamber area 21 is filled with a hydraulic material which is connected through a passageway 25 through the piston 22 to the upper part 26 of the chamber 21 and thereby to the inlet 27 from the tube 12 and sensor 11. The sensor 11 is advantageously placed in the coldest part of the solar heating panel where a liquid therein expands and contracts responsive to temperature changes. This expansion and contraction is transmitted through the tube 12 into the chamber 21 where upon reaching the predetermined temperature drop will draw the piston 22 in the chamber 21 thereby pulling a plunger element 28 having a valve element on the bottom thereof. The plunger element 28 has an annular reduced area 30 while the piston 22 has a bore 31 having an annular lip 32 fitting in the annular reduced area 30 for supporting the reduced area therein. The plunger 28 passes through a seal 34 and is spring biased by a spring 35. The plunger valve element 37 may be a rubber or resilient material supported in a cup portion of the plunger member 28 and drives against a plate 38 circular opening 40 to seal the circular valve seat or opening 40 and to drive the plate against the valve seat 20. The valve element or plate 38 has an annular enlarged portion 41 supported in the valve body 13. The plate 38 may be a metal or flexible plate and is shaped in a partial spherical or cup shape adapted to snap into a closed position, closing against the valve seat 20, while the plunger element 37 seals the opening 40 thereby increasing the pressure behind the plate 38 and plunger 28 in accordance with the pressure side 17 pressure through opening 42 relative to the pressure under the valve seat 20. When the piston 22 and end plunger 28 withdraws by a drop in temperature in the bulb 11, the plate 38 tends to pop open to pass the fluid therefrom. The pressure side 17 has a slightly reduced pressure by the flow of the fluid passing the narrowed valve portion. When the pressure is applied against a much larger surface of the plate 38, it tends to hold the plate in an opened position until the plunger 28 drives the plate to a closed position by sufficient change in the temperature on the remotely located bulb 11. The plate 38 has a small aperture 42 therethrough which balances the pressure on the opposite side of the plate 38 when the valve is opened but allows a build up of pressure on the back of the plate 38 and plunger 28 cup once the plunger 28 blocks the opening 40 to pop plate 38 and plunger 28 closed. This aperture, however, is blocked when the plate 38 is closed against the valve seat 20. When the valve plate 38 and plunger 30 are in the open position as shown in FIG. 1, the solar heated water in the panel is allowed to pass from the pressure side 17 to the dump side 18 through the valve seat 20. When the plunger 28 has pushed the valve element 37 against the plate 38 to opening 40 to push the plate against the valve seat 20, the liquid on the pressure side 17 is blocked from passing through the valve passageway 20. As can be seen, the remotely located valve sensor in the coldest portion prevents the valve from being actuated by changes in the valve temperature and by changes in the flow of fluid through the valve element. The valve element tends not to modulate because the plate 38 acts in a snap acting fashion to thereby be locked in either an opened or a closed position. The valve element as illustrated utilizes mercury or a heavy fluid which tends not to leak or to change its characteristic with wide swings in temperature. The valve 10 is such that it is not affected by changes in the valve temperature or of the liquid passing therethrough or applied thereagainst, but only by the remote sensor 11.

It should be clear at this point that a freeze protection valve for protecting solar heating panels from having the water therein from freezing, has been provided which overcomes prior art problems of variations from valve temperature and from modulating of the valve in certain types of solar heaters as well as operating only from the coldest temperature in the solar panel. However, it should also be clear that the present invention is not to be limited to the forms shown which are to be considered to be illustrative rather than restrictive.

I claim:

1. A solar heater freeze protection valve apparatus comprising in combination:
   a valve housing;
   a remote sensor operatively connected to the valve housing from a remote position, the remote sensor including a bulb containing a liquid adapted to compress and expand with the temperature adjacent the bulb;
   a piston located in the valve body and slidable therein responsive to expansion and contraction of the liquid in the remote sensor;
   a first valve element located in the valve housing and attached to the valve piston for movement therewith;
   a second valve element located in the valve housing and attached to the housing;
   a first valve seat in said second valve element forming an opening therethrough;
   a second valve seat positioned in a water passageway to allow the flow of fluid therethrough when the second valve element is in an open position and to cut off the flow of fluid therethrough when the second valve element is in a closed position, whereby liquid in a solar heater can flow at predetermined temperature readings; and
   said second valve element being biased in one direction and having a second opening therethrough to increase the pressure therebehind when said first valve element closes on the first valve seat and the second valve element closes on the second valve seat.

2. A solar heater freeze protection valve in accordance with claim 1, in which said second valve element is a snap acting valve element driven by the first valve element against the second valve seat responsive to movement of the piston.

3. A solar heater freeze protection valve in accordance with claim 2, including a spring located in the valve housing and biasing the piston to hold the first valve element in a normally open position.

* * * * *